June 18, 1940.   R. B. PARKER   2,204,946
MILLING MACHINE
Filed Sept. 3, 1937   5 Sheets-Sheet 1

Inventor.
Robert B. Parker.
By Louis A. Manson.
Atty.

June 18, 1940.  R. B. PARKER  2,204,946
MILLING MACHINE
Filed Sept. 3, 1937  5 Sheets-Sheet 4

Inventor:
Robert B. Parker.
by Louis A. Maxson.
Atty.

Patented June 18, 1940

2,204,946

UNITED STATES PATENT OFFICE 2,204,946

MILLING MACHINE

Robert B. Parker, Claremont, N. H., assignor to Sullivan Machinery Company, a corporation of Massachusetts Application September 3, 1937, Serial No. 162,276

22 Claims. (Cl. 90—11)

This invention relates to milling machines, and more particularly, but not exclusively, to improvements in a "hot milling machine" of the automatic type especially designed to operate on an appropriately heated rock drill bit for forming or sharpening the cutting surfaces of the bit.

An object of this invention is to provide an improved milling machine whereby the work may be quickly formed with a minimum amount of manipulation, and resultantly the cost of forming the work may be maintained at a minimum. Another object is to provide an improved milling machine of the automatic type whereby the work is moved automatically into its different positions with respect to the milling cutters, thereby reducing the time consumed and the manual operations involved in the forming of the work. A further object is to provide an improved "hot milling machine" especially designed to operate on an appropriately heated article to be formed whereby the portions to be formed of the articles are quickly and readily formed. Yet another object is to provide an improved milling machine especialy designed to use in forming or sharpening rock drill bits having improved means for positioning and supporting the drill bit and for guiding the drill bit with respect to the milling cutters during the forming or sharpening operations. A still further object is to provide an improved milling machine having a pair of milling cutters driven at a relatively high speed, and improved means for guiding and positioning the drill bit relative to the cutters for forming the cutting face and sides of the cutting portion of the bit. A still further object is to provide a novel bit securing means for attaching the bit to the bit holder, together with improved means for supporting and guiding the holder with respect to the milling cutters. A still further object is to provide an improved power operated means for moving the work rectilinearly with respect to one cutter and for locating the work into proper position with respect to the other cutter, and improved power operated means for rotating the work relative to said last mentioned cutter, said power operated means acting automatically and in a definite sequence. A further object is to provide an improved milling machine of the fluid actuated type having improved fluid actuated means for automatically moving the work with respect to the milling cutters, and improved means for controlling said fluid actuated means. Yet another object is to provide an improved power operated means for securing the bit to the work holder barrel. These and other objects and advantages of the invention will, however, hereinafter more fully appear.

In the accompanying drawings there are shown for purposes of illustration one form and a modification thereof which the invention may assume in practice.

In the illustrative embodiment of the invention disclosed herein, there is shown a milling machine of the type known as a "hot milling machine" especially designed for forming the cutting portion of an appropriately heated rock drill bit, such as a detachable rock drill bit of a character similiar to that disclosed in Figs. 1 to 5, inclusive, of the patent to Paul H. Nast, granted August 1, 1939, No. 2,168,102. It will be evident, however, that the improved milling machine may be employed in general milling work.

Figure 1:
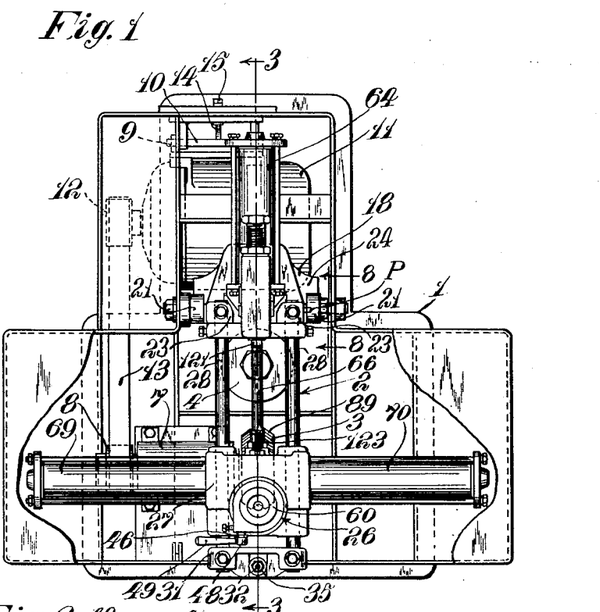
Fig. 1 is a top plan view of an illustrative form of the improved milling machine, a portion of the casing being broken away to show the internal mechanism.
Figure 2:
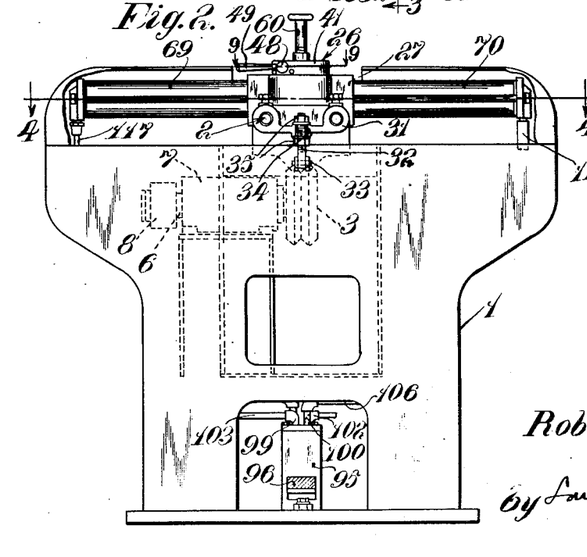
Fig. 2 is a side elevational view of the milling machine shown in Fig. 1.
Figure 3:
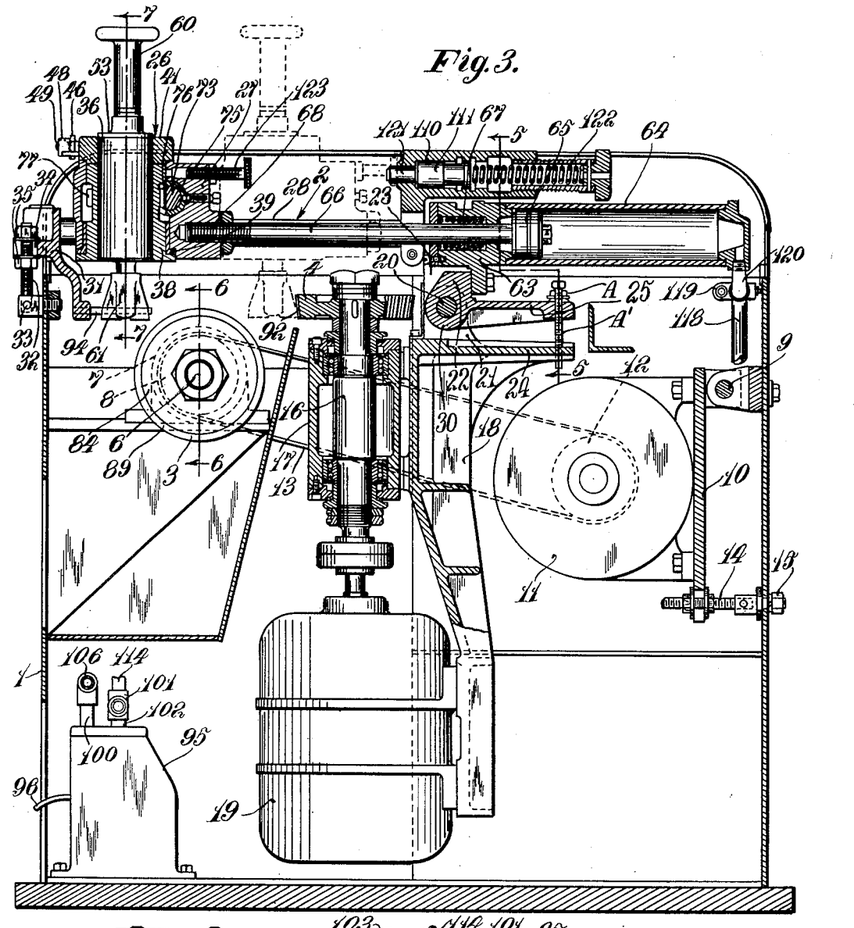
Fig. 3 is an enlarged view in longitudinal vertical section taken substantially on line 3—3 of Fig. 1.
Figures 4, 5, 6:
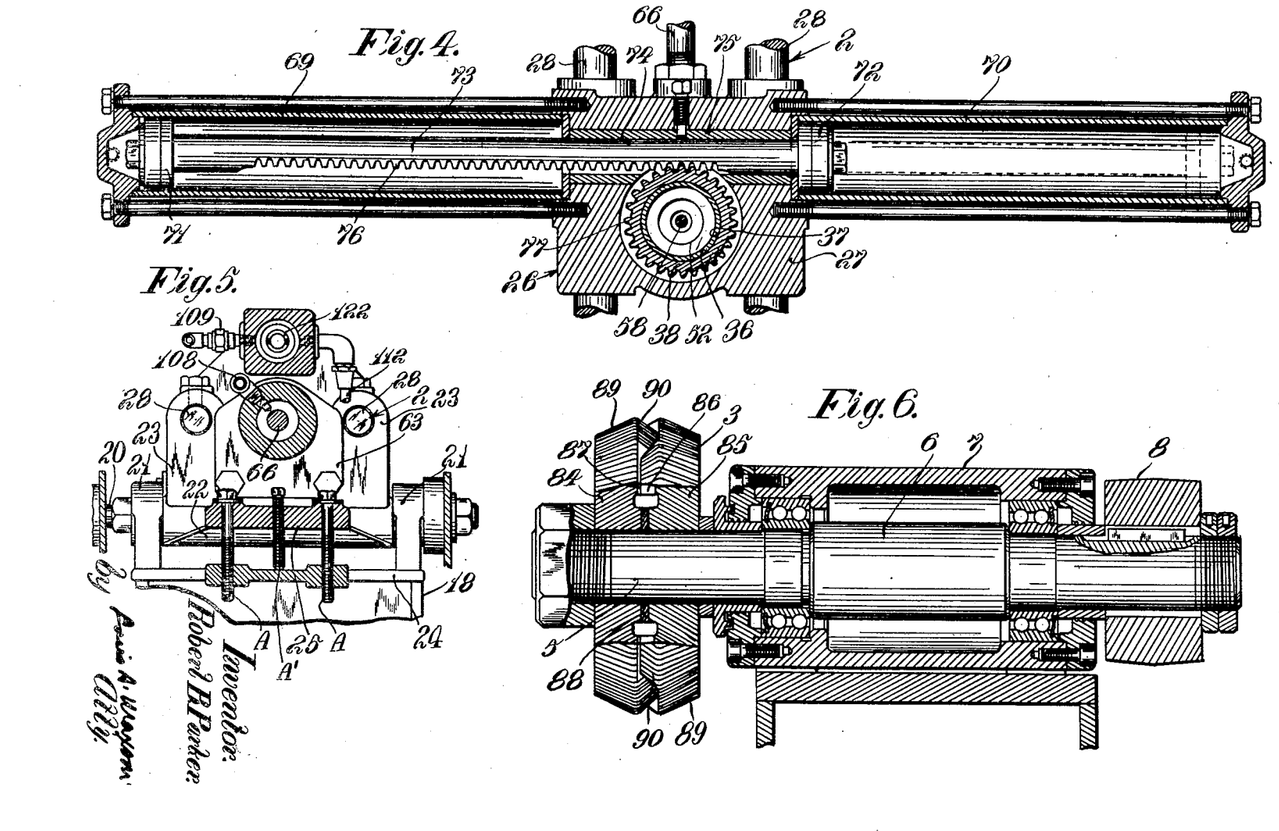
Fig. 4 is an enlarged horizontal sectional view taken substantially on line 4—4 of Fig. 2.
Fig. 5 is a fragmentary cross sectional view taken on line 5—5 of Fig. 3.
Fig. 6 is an enlarged detail cross sectional view taken on line 6—6 of Fig. 3.

The improved milling machine, as disclosed in the drawings, comprises a base frame 1 having mounted thereon a guiding structure 2 for guiding and positioning the work with respect to milling cutters 3 and 4. The milling cutter 3, which is herein a face cutter, is arranged on a horizontal axis, while the milling cutter 4, which is herein a side cutter, is disposed on an upright axis lying in a vertical plane parallel to the side surfaces of the face cutter 3 and lying midway between said side surfaces. The face cutter 3, as shown most clearly in Fig. 6, is secured to the projecting end 5 of a horizontal shaft 6 arranged with its axis extending transversely of the base frame and journaled within ball bearings supported within a bearing bracket 7 suitably mounted within the base frame. Keyed to the other end of the shaft 6 is a pulley 8. As shown in Fig. 3, pivotally mounted at 9 on a bracket secured to one side of the base frame is a plate 10 on which is mounted a motor 11. Keyed to the power shaft of this motor is a pulley 12 connected by an endless belt 13 to the pulley 8. For adjusting the plate 10 about its pivot to vary the tightness of the belt, there is provided a screw 14 carrying nuts at opposite sides of the plate, and the screw is secured to one side of the base frame by means of a locking nut 15.

The side cutter 4 is keyed to one end of an upright shaft 16 which is journaled within ball bearings supported within a bracket 17 suitably secured to a frame 18. Supported on the lower end of the frame 18 is a motor 19 whose power shaft is connected to drive the shaft 16. The frame 18 is pivotally mounted on a transversely extending shaft-forming member 20, which is in turn pivotally supported within the base frame as indicated in Fig. 5. The frame 18 is supported upon the shaft-forming member 20 by means of perforated ears 21, between which the member 20 supports a frame member 22 which has spaced upstanding bosses 23 thereon. The frame 18 has a rearwardly extending portion 24, and the frame member 22 has a rearwardly extending portion 25 overlying the portion 24 of the frame 18. Suitable adjusting screws A and A' serve to vary and to fix the angular relation of the frame 18 to the frame member 22. A work-holding means, later more fully described, and generally designated 26, is mounted on a sliding frame 27 which is reciprocable along the guide rods hereinbefore mentioned. These guide rods, which are numbered 28, at their rearward ends are fixed within the bosses 23. They are parallel, and as a result of their mounting by means of the pivotable frame member 22 their plane may be altered by raising or lowering their forward ends. The outer ends of the guide rods are fixed within a transverse frame 31, and means is provided between this frame and the base frame for adjusting the guide rods in vertical planes about the pivot 20. This adjusting means comprises a screw 32 pivoted on a transverse axis at 33 to permit swinging of the adjusting screw in longitudinal planes, and this screw is receivable within a slot 34 formed within a projection integral with the transverse frame 31. Engaging the opposite sides of this slotted projection are nuts 35 for adjusting the outer ends of the guide rods in a vertical direction about the axis of shaft member 20. This adjustment of the guiding structure enables adjustment of the bit holder structure with respect to the milling cutters. When it is desired to form or sharpen drill bits of different sizes, the nuts 35 may be adjusted to vary the angular relation of the guide structure about its pivot relative to said cutters. If desired, milling cutters of different diameters may be substituted for those disclosed, and the guide structure may be adjusted to compensate for the difference in diameter of the cutters.

One of the ears 21 carries an upstanding lug or projection P serving as a marker, and graduations are formed at P' on the side of the frame 22 so that the angular relation of the axis of the cutter 4 to the planes of the axis of the guide rods 28 may be easily noted. It will be observed that adjustment of the screws A and A' will enable the changing of the relation of the axis of the cutter 4 to the planes of the guide rods, and that the mechanism 32, 33, 34, 35 will change the planes of the guide rods and move the cutter 4 with the rods while maintaining the angular relation of its axis to the plane of the rods unchanged.

Figures 7, 8, 9, 10, 11:
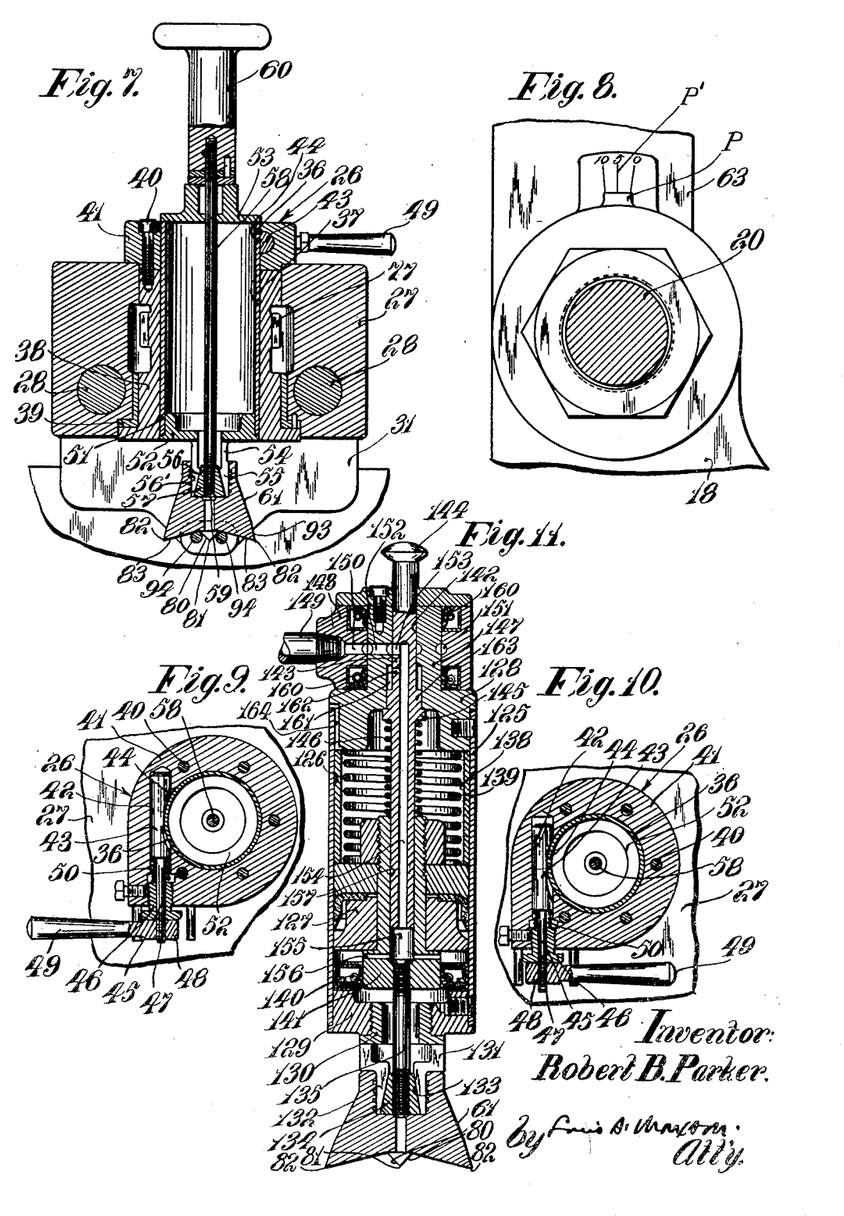
Fig. 7 is an enlarged vertical sectional view taken substantially on line 7—7 of Fig. 3.
Fig. 8 is an enlarged detail sectional view taken substantially on line 8—8 of Fig. 1.
Fig. 9 is an enlarged detail sectional view taken on line 9—9 of Fig. 2.
Fig. 10 is a view similar to Fig. 9 showing the locking parts in a different positon.
Fig. 11 is a vertical sectional view taken in the plane of Fig. 7, showing a modified form of work holder barrel.
Figure 12:
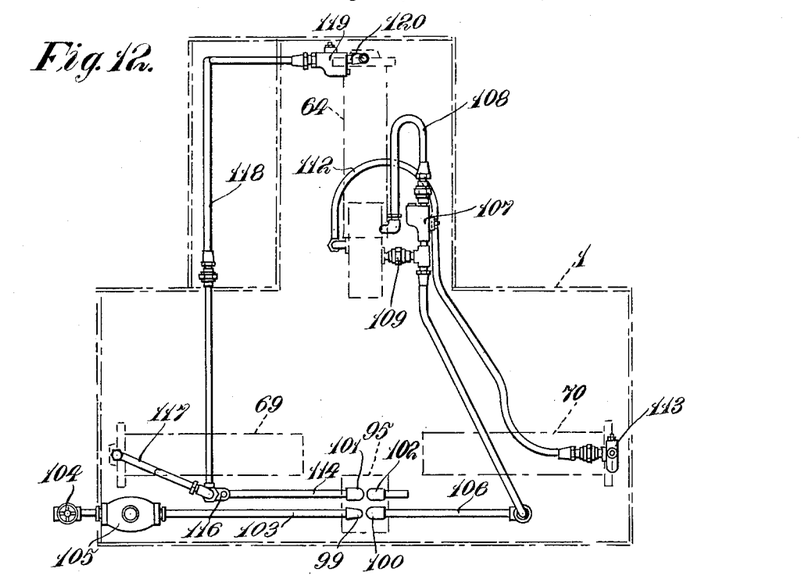
Fig. 12 is a diagrammatic plan view showing the fluid system and associated control valves.
Figure 13:
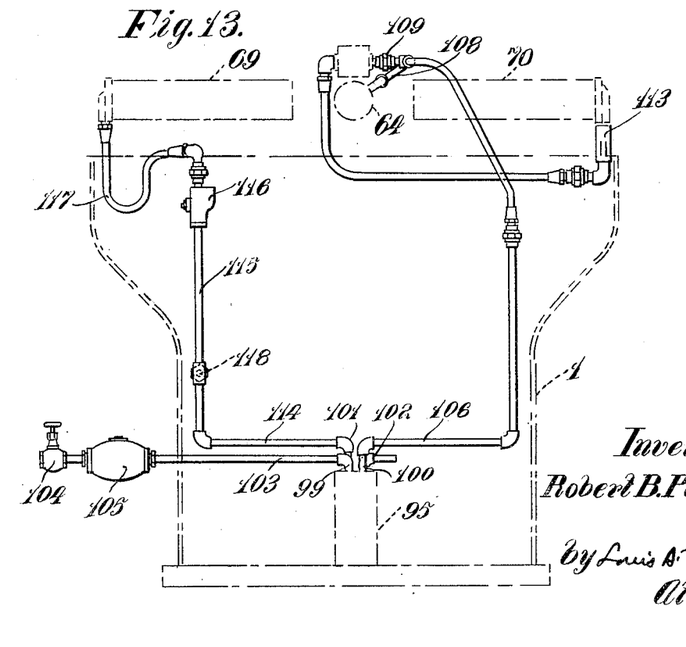
Fig. 13 is a diagrammatic view in side elevation of the fluid system and control valves shown in Fig. 12.

As shown in Figs. 3 and 7, the work holding means comprises a work holder barrel 36 insertible within a vertical bore 37 formed in a rotatable support 38 journalled within a bearing sleeve 39 supported by the sliding frame 27. Secured as by screws 40 to the upper end of the rotatable support 38 is a cap member 41 resting on the top of the sliding frame for retaining the rotatable support in position on its bearing. Reciprocably mounted within a bore 42 formed in the cap member 41 is a locking clamp or plunger 43 having an arcuate clamping surface 44. Integral with this locking member is a stem 45 passing through an opening in a closure plate 46 threaded within the cap member. Threadedly secured at 47 to the plunger stem is an adjusting nut 48 having an operating handle 49. Interposed between the plate 46 and the locking plunger is a coil spring 50 for urging the locking plunger towards its released position. When the operating handle is turned from the position shown in Fig. 9 to the position shown in Fig. 10, the locking plunger 43 is moved axially within its bore to bring its clamping surface 44 into clamping engagement with the exterior periphery of the work holder barrel, to lock the barrel firmly to the rotatable support. As shown most clearly in Fig. 7, the work holder barrel comprises a cylindric sleeve 51 having a lower head 52 and an upper head member 53. Formed on the bottom of the lower head 52 is a slotted projection 54 providing resilient jaws 55 formed with inner inclined surfaces 56 engaging the exterior surface of a jaw expanding wedge 57. Extending centrally within the barrel member is an operating rod 58 threaded at 59 to the wedge 57 and provided at its upper end with an operating handle 60. The jaws 55 are receivable within a socket 56' of a drill bit generally designated 61 which, as previously pointed out, may be of the type disclosed in the above mentioned Nast patent. When the operating rod is rotated, upward axial movement of the wedge relative to the bit is effected, due to the threaded engagement between the rod and wedge, thereby spreading the jaws apart and causing the same to grip the drill bit to hold securely the bit in position on the holder. By releasing the locking plunger 43, the work holder barrel may be withdrawn axially from the bore of the rotatable support 38 in an obvious manner.

Now referring to the improved power operated means for moving the work holding means along its guiding means to move the bit rectilinearly with respect to the face cutter 3 and to locate the bit in operative relation with respect to the side cutter 4, it will be noted that mounted on a bracket 63, which is herein bolted to the member 22 which supports the rear ends of the rods 28, is a horizontal cylinder 64 containing a reciprocable piston 65 as shown in Fig. 3. The piston has a piston rod 66 extending outwardly through a stuffing box 67 supported within the bracket 63, and the piston rod is secured at 68 to the sliding frame 27. It will thus be seen that when pressure fluid is supplied to one end or the other of the cylinder 64, the piston may be moved axially to slide the sliding frame 27 in one direction or the other along the parallel guide rods 28. It will further be noted that tilting of the guide rods will cause corresponding tilting of the cylinder 64, which constantly remains parallel to said guide rods.

The improved power operated means for rotating the rotatable support for the work holder barrel relative to the sliding frame comprises, as shown most clearly in Fig. 4, alined cylinders 69 and 70 horizontally disposed at the opposite sides of the sliding frame 27 and supported by the latter; and these cylinders contain reciprocable pistons 71 and 72 respectively connected for movement in unison by a common piston rod 73. As illustrated, this piston rod extends through a bore 74 formed in a sleeve 75 secured within the sliding frame 27 and has formed along one side thereof rack teeth 76 meshing with the teeth of a spur gear 77 formed on the rotatable support 38. It will thus be seen that when fluid pressure is supplied to one cylinder or the other, the pistons may be moved to effect axial movement of the rack, thereby to rotate the rotatable support in one direction or the other as preferred. The means for supplying pressure fluid to these operating cylinders for the work holder barrel will be later described.

Now referring to the particular structure of the drill bit and the milling cutter shapes, it will be noted that formed on the cutting face of the drill bit 61 are converging surfaces 80, 80 intersecting at their forward edges in diametrically alined cutting edges 81, 81; and arranged at the opposite sides of the alined cutting edges are chopping edges 82, 82 formed at the outer forward extremities of inclined plane surfaces 83. The surfaces intersecting in the cutting edges and the surfaces 83, in this instance, lie in the sides of dihedral angles, and the surfaces intersect along lines parallel with the cutting edges. The specific bit structure does not per se enter into this invention and is clearly disclosed in the Nast patent mentioned above, and therefore a more detailed description thereof is unnecessary. As clearly shown in Fig. 6, the face milling cutter 3 comprises cooperating parts 84 and 85 each having on its inner surfaces projections 86 fitting within sockets 87 on the other, so that the cutter parts are interlocked against relative rotation but free for relative axial adjustment. When it is desired relatively axially to adjust the cutter parts, washers 88 of different thicknesses may be interposed between the cutter parts, or the washer may be omitted and the cutter parts held directly in contact. The cooperating cutter parts are formed with relatively inclined cutting surfaces 89 and 90, and these are so formed as to form properly the shape of the cutting end of the drill bit upon relative movement in the proper direction between the bit and cutter. From the foregoing, it will be evident that the forward surfaces on the bit arc made up of planes all parallel to a single line, and therefore it is necessary only to move the bit in a rectilinear path tangentially with respect to the face cutter 3 in order that these parallel bit surfaces be appropriately formed. The side cutter 4 is formed of tapered teeth 92 shaped to conform to the inclined side surface 93 of the bit, so that when the bit is brought into operative position with respect to the side cutter and the bit holder barrel is rotated, the side surfaces of the cutting portion of the bit are appropriately formed.

Improved means is provided for definitely and accurately locating the drill bit relative to the face cutter 3 so that when the holder barrel is inserted within the rotatable support 38 on the sliding frame, the bit is definitely located in position on the frame. This bit-locating, or so-called bit-gauging, means comprises parallel gauge pins 94, 94 fixed to the transverse frame 31 and arranged parallel to the guide rod axes, and when the holder barrel is inserted within the rotatable support, the bit is dropped in position with its inclined surfaces 80, 80 engaging the gauge pins, thereby insuring proper relation of the cutting edge and the face surfaces with respect to the surfaces of the face cutter. As above mentioned, when the bit is properly positioned or gauged, the locking plunger 43 is moved axially to clamp the holder barrel rigidly to the rotatable support, and when the sliding frame is slid inwardly along the guiding rods, the bit slides off the gauge pins into contact with the teeth of the face cutter.

Figure 14:
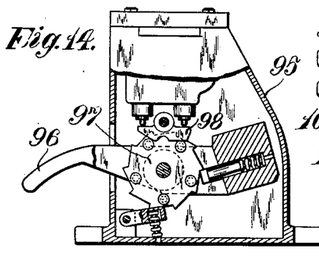
Fig. 14 is a detail sectional view illustrating the fluid control valve.
Figure 15:
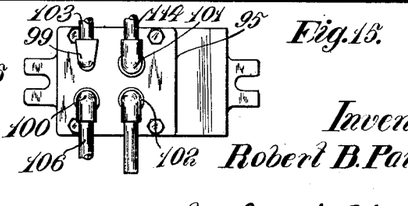
Fig. 15 is a top view of the control valve box.

Now referring to the fluid system and the fluid valve means, it will be noted that arranged within the base frame is a valve box 95 having valve means (not shown) operable by a foot treadle 96 projecting outwardly through an opening in the side of the base frame, as clearly shown in Fig. 3. This valve box is of conventional construction and comprises operating means for the valve means including a rotatable cam member 97 (see Fig. 14) operated by the foot treadle and having cam rollers arranged to operate a pivoted lever 98, the latter having its opposite arms engaging the valves of the valve means. Opening into the top of the valve box are four passages 99, 100, 101 and 102, and a valve is provided for controlling each passage. A fluid supply pipe 103 is connected to the passage 99 in the valve box, and this supply pipe has a manual shut-off valve 104 and a conventional automatic line oiler 105. The valve box passage 100 is connected by a pipe 106, through an adjustable speed control valve 107, to a conduit 108 leading to the inner end of the fluid cylinder 64. A branch pipe 109 connects the pipe 106 to a valve bore 110 containing a plunger valve 111 (see Fig. 3) as hereinafter described. Also connected to the valve bore 110 and controlled by the plunger valve 111 is a flexible conduit 112 connected, through an adjustable speed control valve 113, to the outer end of the fluid cylinder 70. The passage 101 in the valve box 95 is connected by a pipe 114 to a pipe 115, in turn connected through an adjustable speed control valve 116 to a flexible conduit 117 leading to the outer end of the fluid cylinder 69. The pipe 114 is also connected to a pipe 118 in turn connected through an adjustable speed control valve 119 to a pipe 120 leading to the outer end of the fluid cylinder 64. The passage 102 in the valve box 95 is connected to exhaust. The plunger valve 111 in the valve bore 110 has an operating stem 121 (see Fig. 3), and the valve is held in its closed position by a coil spring 122. The sliding frame 27 of the work holder has fixed thereto an adjustable screw 123 providing an abutment so that as the frame 27 reaches its limit of movement, the screw engages the stem of the plunger valve to move the latter into its open position, thereby to admit pressure fluid from the pipe 106 and branch pipe 109, past the plunger 111 to the conduit 112, and thence to the outer end of the cylinder 70.

When the operator presses his foot on the treadle 96 to supply pressure fluid from the supply pipe 103 to the pipe 106 and simultaneously operates the valve means to connect the pipe 114 to the exhaust passage 102, pressure fluid then flows through the pipe 106 past the control valve 107 and conduit 108 to the inner end of the fluid cylinder 64, thereby moving the piston 65 outwardly from the position shown in Fig. 3, and, as a result, the work holder is moved inwardly along its guide rods to effect traversing movement of the drill bit in a rectilinear path relative to the face cutter 3. As the work holder nears its innermost position of travel, as indicated in dotted lines in Fig. 3, the screw abutment 123 engages the plunger valve stem to move the plunger valve into a position to admit pressure fluid from the branch pipe 109 to the conduit 112 and past the control valve 113 to the outer end of the fluid cylinder 70. The initial position of the piston 72 in the fluid cylinder 70 is indicated in dotted lines in Fig. 4, and the pressure fluid on this piston moves the latter inwardly to effect axial movement of the rack 76, and, as a result, the work holder support is rotated by engagement of the rack with the gear formed on the rotatable support 38. Rotary movement of the work holder effects rotation of the drill bit relative to the side cutter, thereby to form the sides of the cutting portion of the bit. When the forming operation is completed, the operator again presses on the foot treadle to move the valves of the valve means in the valve box 95 into a position to connect the pipe 106 to the exhaust passage 102 and to connect the pipe 114 to the supply passage 103. Pressure fluid then flows from the supply pipe 103 through the pipe 114, pipe 115 past the control valve 116 and conduit 117 to the outer end of the cylinder 69, the pressure fluid acting on the piston 71 to move the latter inwardly to effect movement of the piston 72 into its initial position. At the same time pressure fluid flows through the pipe 118 past the control valve 119 and through pipe 120 to the outer end of the cylinder 64, the pressure fluid acting on the outer pressure area of the piston 65 to move the latter inwardly back to the full line position shown in Fig. 3. It will thus be seen that the operations are effected in a definite sequence: the drill bit first traversing the face cutter, then moving into its operative position with respect to the side cutter, and thereafter the drill bit is automatically rotated relative to the side cutter, thereby to complete the forming operation.

The modified form of work holder shown in Fig. 11 comprises a barrel 125 having a bore 126 containing a piston 127. The barrel 125 has secured thereto an upper head 128 and a lower head 129. Threadedly secured within the lower head is a member 130 having a slotted projection 131 forming resilient jaws 132. These jaws have inner inclined surfaces 133 with which engages a wedge member 134. This wedge member is connected by a rod 135 to the piston 127. A sleeve 138 in the bore 126 provides at its lower end an abutment for limiting upward movement of the piston. Interposed between the lower surface of the head 128 and the upper side of the piston 127 is a coil spring 139 for constantly urging the piston towards its lowermost wedge-releasing position. A packing 140 embraces a bottom projection 141 of the piston 127 to prevent leakage of pressure fluid from the barrel bore beneath the piston past the reduced projection 141. Guided in an axial bore 142 formed in the upper head is a control rod 143 having an operating handle 144. Interposed between a collar 145 formed on the control rod and the upper side of the piston 127 and surrounding the control rod is a coil spring 146 for constantly urging the control rod towards its uppermost position. Swivelly mounted on the upper cylindrical reduced portion 147 of the upper head 128 is a member 148 having connected thereto a fluid supply pipe 149. This supply pipe may be connected in any suitable manner to the valve box 95, so that the supply of pressure fluid thereto may be controlled by the foot treadle 96, although if desired, a separate control valve for the pipe 149 may be provided. The pipe 149 is connected through a passage 150 and groove 151 in the member 148 and a passage 152 in the upper head to a passage 153 formed in the control rod 143, and this passage 153 is connected through an axial passage 154 in the control rod to a chamber 155, the latter being connected by passages 156 to the barrel bore at the lower side of the piston 127. The control rod 143 has a fluid tight telescopic relation at 157 with the piston 127. Carried by the member 147 and embracing the reduced portion of the upper head 128 are packings 160, 160 for preventing leakage of pressure fluid along the cooperating surfaces of the members 128 and 147. Substantially to counterbalance the pressure acting on the lower end of the control rod 143, pressure fluid is supplied to an opposed pressure area 161 through a passage 162 communicating with the axial passage 154. This pressure area is formed on a cylindrical portion 163 of the control rod guided in a bore in the upper head 128. The opposed pressure areas on the control rod are substantially counterbalanced so that the coil spring 146 always tends to move the rod into its uppermost position. When the drill bit is placed in position on the projection 132 with the latter projecting inwardly within the bit socket, and the control rod 143 is moved into the position shown, pressure fluid may flow through the pipe 149, passages 150, groove 151, and passages 152, 153, 154 to the chamber 155 and through the passage 156 to the barrel bore at the lower side of the piston 127, the pressure fluid acting on the piston to move the latter upwardly, and as a result, the wedge member 134 is moved upwardly to expand the jaws 132 into clamping engagement with the walls of the drill bit socket. When the control rod 143 is moved downwardly the pressure fluid supply is cut off, and the cylindrical portion 163 moves out its bore, thereby connecting the barrel bore at the lower side of the piston 127 to exhaust through passages 156, axial passage 154, and passage 162 communicating at that time with the barrel bore at the upper side of the piston 127. A suitable bleeding-off of the pressure from the space above the piston 127 is provided, as by making the head 128 not a sealing fit for the sleeve 125, or providing a bleed passage as at 164. The exhausting pressure fluid flowing through the passage 162 to the barrel bore at the upper side of the piston 127 acts on the upper surface of the piston to aid the spring 139 in moving the piston 127 downwardly, thereby to release the holder jaws 132 from the drill bit. As in the form of the invention above described, the bit holder barrel is insertible in the bore of the rotatable support 38 and clamped therein by the locking plunger 43. Otherwise, this form of the invention is the same as that above described.

The general mode of operation of the improved milling machine is as follows: The motors 11 and 19 are first started to effect rapid rotation of the milling cutters 3 and 4. When the drill bit to be formed or sharpened is heated to the proper temperature, the jaws of the holder barrel are inserted within the socket in the drill bit and the bit locked in position on the barrel by the gripping engagement of the jaws with the socket walls. When the bit is securely locked in position on the holder barrel, the barrel is inserted within the bore in the rotatable support 38 and the barrel is then moved downwardly to bring the surfaces on the bit face into engagement with the parallel gauge pins 94, 94, thereby to locate properly the bit with respect to the cutting surfaces of the face cutter 3, and when the bit is properly located the clamping plunger 43 is moved to clamp securely the barrel to the rotatable support 38. When the bit is properly located in the position shown in Fig. 3, the operator presses down the foot treadle 96 to operate the mechanism in valve box 95 to supply pressure fluid to the inner end of the fluid cylinder 64 at the inner side of the piston 65, the pressure fluid acting on the inner surface of the piston to move the latter inwardly within the cylinder bore, thereby moving the sliding frame 27 of the work holding means rectilinearly along the parallel guide rods of the guiding means, and as a result the drill bit is moved in a rectilinear path across the cutting surfaces of the face milling cutter, thereby to form the cutting surfaces of the bit. As the sliding frame of the work holding means nears its limit of inward travel along the guide rods, the abutment screw 123 on the sliding frame engages the stem of the plunger valve 111 to move the latter into a position to supply pressure fluid to the outer end of the fluid cylinder 70. When the plunger valve 111 is in its open position, the drill bit is located in proper side-forming relation with respect to the side cutter 4 as indicated in dotted lines in Fig. 3. The pressure fluid flowing to the outer end of the cylinder 70 acts on the outer surface of the piston 72 (the latter being in the dotted line position indicated in Fig. 4 at that time), moving the piston inwardly, thereby to effect axial movement of the rack 76, and as a result the support 38 for the holder barrel is rotated to rotate the drill bit relative to the rapidly rotating side cutter 4 to form the side surfaces of the cutting portion of the bit. When the bit forming or sharpening operation is completed, the operator again presses on the foot treadle 96 of the valve box 95—the bit having, of course, been previously removed—thereby to move the fluid controlling means in the valve box into a position to supply pressure fluid to the outer end of the fluid cylinder 69 at the outer side of the piston 71 and to the outer end of the fluid cylinder 64 at the outer side of the piston 65 to effect inward movement of the pistons 65 and 71 to their initial position, while at the same time the inner ends of the cylinders 64 and 70 are connected to exhaust. The speed control valves 107, 113, 116 and 119 may be adjusted to obtain the desired rates of movement of the pistons 65, 71 and 72 so that the proper rate of movement of the drill bit with respect to the face and side milling cutters may be attained. By suitable adjustment of the screws A and A', the angular relation of the axis of rotation of the side milling cutter 4 with respect to the plane of the guideways 28 may be varied as desired to attain the desired taper at the side surfaces of the cutting portion of the drill bit, and by adjusting the adjusting nuts 35 for the guiding means 2, the relation of the work holding means with respect to the face milling cutter 3 may be varied as desired. When the form of the improved work holder barrel as shown in Fig. 11 is employed instead of the holder barrel 36, the supply pipe 148 may be suitably connected to the valve box or may be connected to a separate source of fluid supply so that when the bit is inserted on the gripping jaws of the barrel, the jaw operating wedge may be actuated by pressure fluid to lock securely the bit on the barrel. This pressure fluid operated locking operation for the bit may take place either before or after the barrel is inserted within the rotatable support 38. Otherwise the method of operation of this form of the invention is the same as that above described.

As a result of this invention, it will be noted that an improved milling machine is provided, especially designed for the forming of the cutting surfaces of a rock drill bit whereby the bit cutting surfaces may be quickly and readily formed. It will further be noted that by rotating the milling cutters at a relatively high speed and heating the bit to a safe degree above the critical temperature prior to the "hot" milling operation, forming of the cutting surfaces of the bit is greatly facilitated and wear of the cutters is greatly decreased. It will still further be evident that by the provision of the rapidly rotating milling cutters and the power operated operating means for moving the bit with respect to the cutters, the speed of the forming process is greatly increased over that of a conventional forging machine or grinding wheel. Other uses and advantages of the improved milling machine will be clearly apparent to those skilled in the art.

While there are in this application specifically described one form and a modification which the invention may assume in practice, it will be understood that this form and modification thereof are shown for purposes of illustration and that the invention may be further modified and embodied in various other forms without departing from its spirit or the scope of the appended claims.

What I claim as new and desire to secure by Letters Patent is:

1. In a milling machine, in combination, relatively rotatable face and side milling cutters, means for driving said cutters, work supporting and guiding means for locating and supporting the work in operative relation with respect to said cutters one at a time, and motor operated means for moving the work relative to said face cutter to effect the face milling operation, for thereafter locating the work in operative position with respect to said side cutter and for moving the work relative to said side cutter to present different portions of the side of the work successively to the side cutter to effect the side milling operation.

2. In a milling machine, in combination, relatively rotatable face and side milling cutters, means for driving said cutters, work supporting and guiding means for locating and supporting the work in operative relation with respect to said cutters one at a time, motor operated means for first moving the work relative to said face cutter and for thereafter moving the work from its position at the completion of the face cutting operation and locating the work in operative position with respect to said side cutter, and motor operated means operative when the work is located with respect to said side cutter for moving the work relative to said side cutter.

3. In a milling machine, in combination, relatively rotatable face and side milling cutters, means for driving said cutters, and motor operated means for first moving the work rectilinearly with respect to said face cutter and for thereafter locating the work in operative position with respect to said side cutter, and motor operated means operative when the work is located relative to said side cutter for rotating the work relative to said side cutter.

4. In a milling machine, in combination, relatively rotatable face and side milling cutters, means for driving said cutters, motor operated means for first moving the work rectilinearly with respect to said face cutter and for thereafter locating the work in operative position with respect to said side cutter, motor operated means operative when the work is located relative to said side cutter for rotating the work relative to said side cutter, and means for effecting operation of said motor operated means in a definite sequence.

5. In a milling machine, in combination, relatively rotatable face and side milling cutters disposed on axes arranged in substantially right angular relation, means for driving said cutters, work supporting and guiding means for locating and supporting the work with respect to said cutters, motor operated means to move the work relative to one milling cutter to effect one milling operation and to thereafter position the work relative to the other milling cutter, and motor operated means for moving the work when so positioned relative to said other milling cutter for effecting another milling operation for moving said work relative to the guiding means.

6. In a milling machine, in combination, relatively rotatable face and side milling cutters disposed on axes arranged in substantially right angular relation, means for driving said cutters, motor operated means for moving the work rectilinearly with respect to said face cutter and for locating the work in operative position with respect to said side cutter, and motor operated means for rotating the work relative to said side cutter.

7. In a milling machine, in combination, relatively rotatable face and side milling cutters disposed on axes arranged in substantially right angular relation, means for driving said cutters, motor operated means for moving the work rectilinearly with respect to said face cutter and for locating the work in operative position with respect to said side cutter, motor operated means for rotating the work relative to said side cutter, and means for effecting operation of said motor operated means in a definite sequence.

8. In a milling machine, in combination, relatively rotatable face and side milling cutters, means for driving said cutters, a fluid actuated motor for first moving the work in operative relation with respect to said face cutter to effect a face milling operation thereon, and a fluid actuated motor for thereafter moving the work relative to said side cutter to effect a side milling operation thereon.

9. In a milling machine, in combination, relatively rotatable face and side milling cutters, means for driving said cutters, means providing a guideway, work supporting means arranged on said guideway for movement therealong, motor operated means for moving said work supporting means relative to said guideway to move the work relative to said face cutter and for locating the work in operative position with respect to said side cutter, and motor operated means for rotating the work relative to said side cutter.

10. In a milling machine, in combination, relatively rotatable face and side milling cutters, means for driving said cutters, means providing a guideway, work supporting means arranged on said guideway for movement therealong, motor operated means for moving said work supporting means relative to said guideway to move the work relative to said face cutter and for locating the work in operative position with respect to said side cutter, motor operated means for rotating the work relative to said side cutter, and means for effecting operation of said motor operated means in a definite sequence.

11. In a machine of the character described, in combination, relatively rotatable circular forming members, means for rotating said members independently of any movement of the work relative thereto, work supporting and guiding means for supporting and guiding the work into operative relation relative to said forming members one at a time, and motor operated means for moving the work relative to the guiding means throughout the transition of the work between said forming members and during the forming operations.

12. In a machine of the character described, in combination, relatively rotatable circular forming members, means for rotating said members, a motor for first moving the work relative to one forming member and for thereafter locating the work in operative position with respect to said other forming member, and a motor operative when the work is located with respect to said other forming member for moving the work relative to said last mentioned forming member.

13. In a machine of the character described, in combination, relatively rotatable circular forming members, means for rotating said members, a motor for first moving the work relative to one forming member and for thereafter locating the work in operative position with respect to said other forming member, a motor operative when the work is located with respect to said other forming member for moving the work relative to said last mentioned forming member, and means for effecting operation of said motors in a definite sequence.

14. In a machine of the character described, in combination, relatively rotatable circular forming members, means for rotating said members, work supporting and guiding means for adjusting the work selectively into and supporting it in cooperating forming relation with said forming members including means for guiding the work in a rectilinear path with respect to one forming member and for supporting the work for rotation with respect to the other forming member, a motor for moving the work in said rectilinear path, and a motor for rotating the work.

15. In a machine of the character described, in combination, relatively rotatable circular forming members, means for rotating said members, work supporting and guiding means for adjusting the work selectively into and supporting it in cooperating forming relation with said forming members including means for guiding the work in a rectilinear path with respect to one forming member and for supporting the work for rotation with respect to the other forming member, a motor for moving the work in said rectilinear path, a motor for rotating the work, and means for effecting operation of said motors in a definite sequence.

16. In a milling machine, in combination, relatively rotatable face and side milling cutters, means for driving said cutters, work supporting and guiding means for locating and supporting the work with respect to said cutters and including a guideway arranged at substantially right angles to the cutter axes and a work holding frame slidably guided on said guideway, a motor for moving said holding frame relative to said guideway to move the work relative to one milling cutter to effect one milling operation and for locating the work relative to the other milling cutter, and a motor for moving the work when so located relative to said other milling cutter to effect another milling operation.

17. In a milling machine, in combination, relatively rotatable face and side milling cutters, means for driving said cutters, work supporting and guiding means for locating and supporting the work with respect to said cutters including a guideway arranged at substantially right angles to the cutter axes, a work holding frame slidably guided on said guideway and a work support rotatably mounted on said holding frame, a motor for moving said work holding frame relative to said guideway to move the work relative to one milling cutter to effect one milling operation and for locating the work relative to the other milling cutter, and a motor mounted on said holding frame for rotating said work support to move the work when so located relative to said other milling cutter to effect another milling operation.

18. In a milling machine, a rotatable face milling cutter, a rotatable side milling cutter, means for supporting and guiding the work for translatory movement with respect to said face milling cutter and for rotary movement with respect to said side milling cutter, and motor operated means for effecting such translatory and rotary movements of the work with respect to said supporting and guiding means.

19. In a milling machine, in combination, relatively rotatable face and side milling cutters disposed on axes which remain relatively fixed and stationary during the milling operation, means for rotating said cutters, work supporting and guiding means for locating and supporting the work with respect to said cutters, motor operated means for moving said work supporting means relative to the guiding means for moving the work relative to one of said milling cutters to effect one milling operation and for moving said work from its position at the conclusion of said first milling operation and locating the work relative to the other milling cutter, and motor operated means for moving the work when so located relative to said other milling cutter for effecting another milling operation.

20. In a milling machine, in combination, relatively rotatable face and side milling cutters disposed on axes which remain relatively fixed and stationary during the milling operation, means for rotating said cutters, motor operated means for moving the work rectilinearly with respect to said face cutter and for locating the work in operative position with respect to said side cutter, and motor operated means for rotating the work relative to said side cutter.

21. In a milling machine, in combination, relatively rotatable face and side milling cutters disposed on axes which remain relatively fixed and stationary during the milling operation, means for rotating said cutters, motor operated means for moving the work rectilinearly with respect to said face cutter and for locating the work in operative position with respect to said side cutter, motor operated means for rotating the work relative to said side cutter, and means for effecting operation of said motor operated means in a definite sequence.

22. In a milling machine, in combination, relatively rotatable face and side milling cutters, means for driving said cutters, work supporting and guiding means for locating and supporting the work in operative relation with respect to said cutters one at a time, and means automatically operative in a definite sequence for first moving the work relative to said face cutter to effect the face milling operation, then locating the work in operative milling position with respect to said side cutter and thereafter moving the work relative to said side cutter to effect the side milling operation.

ROBERT B. PARKER.

CERTIFICATE OF CORRECTION.

Patent No. 2,204,946.                                June 18, 1940.

ROBERT B. PARKER.

It is hereby certified that error appears in the printed specification of the above numbered patent requiring correction as follows: Page 6, first column, lines 42 and 43, claim 5, strike out the words "for moving said work relative to the guiding means" and insert the same after "means" in line 36, same claim; and that the said Letters Patent should be read with this correction therein that the same may conform to the record of the case in the Patent Office.

Signed and sealed this 24th day of September, A. D. 1940.

(Seal)

Henry Van Arsdale,
Acting Commissioner of Patents.